United States Patent Office 2,782,944
Patented Feb. 26, 1957

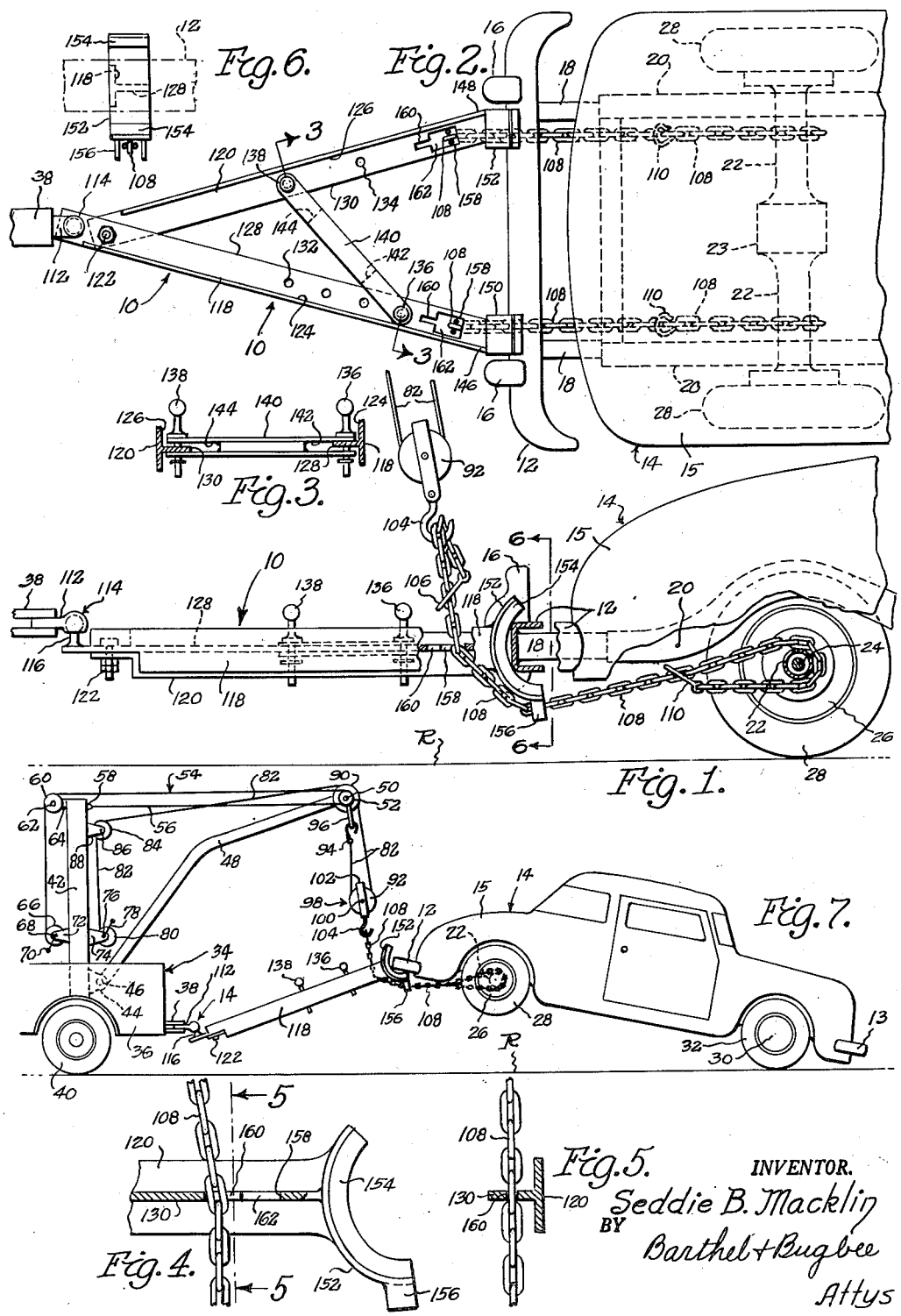

2,782,944

VEHICLE TOWING DEVICE

Seddie B. Macklin, Buffalo, Wyo.

Application May 13, 1954, Serial No. 429,476

5 Claims. (Cl. 214—86)

This invention relates to vehicle towing devices for so-called wrecking trucks and, in particular, to automobile tow bars.

One object of this invention is to provide an automobile tow bar device for wrecking trucks which is adjustable to fit all types and models of automobiles, and especially to recent models thereof possessing rock guards between the bumper and the body interfering with the attaching of previous types of tow bars.

Another object is to provide an automobile tow bar device for wrecking trucks which directly engages the bumper of the automobile being towed, and is adjustable to fit the bumper either on the inside or on the outside of the bumper guards ordinarily mounted thereon.

Another object is to provide an automobile tow bar device for wrecking trucks which enables the tie chains to be attached to the automobile axle housing or to the wheel suspension, the tow bar device having means for guiding the chains around the automobile bumper into convenient connections with the hoisting apparatus of the towing vehicle.

Another object is to provide an automobile tow bar device having bumper-engaging members at the ends thereof which avoid concentrating the entire towing load on the bumper, as in prior towing arrangements, but which distribute the towing load between the bumper and the axle or wheel suspension to which the tie chains are connected.

Another object is to provide an automobile tow bar device for wrecking trucks of the foregoing character which is of simpler construction, of lighter weight and less expensive to manufacture and sell than previous tow bars, yet which will perform the same work and tow the same loads in a superior manner as compared with the prior tow bars.

Another object is to provide an automobile tow bar device for wrecking trucks of such construction that the tie chains before their attachment to the car axle may also be used to lift the tow bar device into proper alignment with the axle of the automobile to be towed while the towing vehicle is being backed into position, and which will be automatically pulled into tight non-slipping engagement with the bumper after the tie chains have been attached to the automobile axle housings or wheel suspensions and hoisting has commenced.

Other objects and advantages of the invention will become apparent during the course of the following description of the accompanying drawings, wherein:

Figure 1 is a side elevation of a tow bar device mounted on a wrecking truck, according to one form of the invention, certain parts being shown in section and with the tie chains attached to the automobile before hoisting has commenced;

Figure 2 is a top plan view of the tow bar device attached as in Figure 1, but with the hoisting tackle omitted;

Figure 3 is a vertical section through the spreader bar taken along the line 3—3 of Figure 2;

Figure 4 is an enlarged fragmentary vertical section through one of the tow bar members showing the use of the tie chain in lifting the tow bar device to align it with the automobile bumper;

Figure 5 is a vertical cross section taken along the line 5—5 in Figure 4;

Figure 6 is a vertical cross-section taken along the line 6—6 in Figure 1, showing the tie chain guide on one of the bumper-engaging members; and Figure 7 is a composite side elevation of the tow bar device attached to the automobile and the latter in its hoisted position ready for towing to commence.

Referring to the drawings in detail, Figures 1 and 2 show an automobile tow bar device, generally designated 10, according to one form of the invention as engaged with the rear bumper 12 of an automobile generally designated 14 with a body 15. The bumper 12 has the usual bumper guards 16 mounted on the usual bumper arms 18 connected to the automobile frame 20 in the usual way. The automobile frame 20 carries the usual springs (not shown) by which the rear axle housing 22 and differential housing are supported, and the axle housing in turn contains the rear axle 24 by which power is transmitted from the differential (not shown) to the rear wheels 26 and tires 28, in the usual manner. The frame 20 at its forward end is also provided with the usual front wheel suspensions (not shown) by which the front wheels 30 and their tires 32 are supported on the frame 20.

The towing vehicle or wrecking truck, generally designated 34 (Figure 7), is conventional and its details form no part of the present invention. For the purposes of the present invention, it includes a body 36 mounted on a frame 38 upon which the rear wheels 40 are supported by the usual springs (not shown). Mounted on the frame 38 is a pillar or stanchion 42 carrying a bracket 44 which in turn supports a pivot pin 46 upon which a hoisting boom 48 is pivotally mounted. The outer end of the boom 48 carries an axle 50 upon which a pulley or sheave 52 of a boom raising tackle generally designated 54 is rotatably mounted. The boom raising tackle 54 includes a cable 56 anchored as at 58 to the upper portion of the stanchion 42 and passing rearwardly around the pulley or sheave 52, thence forwardly and downwardly around a pulley or sheave 60 rotatably mounted on an axle 62 carried by a bracket 64 at the top of the stanchion 42 and continuing downward to a winding drum or windlass 66. The latter is mounted upon an axle 68 carrying a hand crank 70 and rotatably supported upon a bracket 72 near the lower end of the stanchion 42.

Also mounted near the lower end of the stanchion 42 but on the opposite side thereof from the bracket 72 is a second bracket 74 in which is rotatably mounted an axle 76 provided with a hand crank 78 and carrying a winding drum or windlass 80 from which a cable 82 proceeds upwardly around a sheave or pulley 84. The sheave or pulley 84 is mounted on an axle 86 supported by a bracket 88 mounted near the top of the stanchion 42. The cable 82 continues from the sheave or pulley 84 rearwardly around a pulley 90 which is also rotatably mounted upon the axle 50 at the rearward or upper end of the boom 48 and continues downwardly around a sheave or pulley 92, thence upwardly to a hook 94 secured to a yoke 96 depending from the axle 50. The sheave or pulley 100 is carried by a bracket 102 from which a hook 104 depends. Looped over the hook 104 and secured by chain hooks 106 (Figure 1) engaging their standing portions are two tie chains 108, the opposite end portions of which are looped around the axle housing 22 at laterally-spaced locations on opposite sides of the differential housing 23

(Figure 2) and secured by chain hooks 110 also engaging the standing portions of the tie chains 108.

Secured to and extending rearwardly from the towing vehicle frame 38 is the socket member 112 of a coupling 114, the ball member 116 of which is mounted on the forward end of one of the side bars 118 of the tow bar device 10, the side bar 118 near its forward end being pivotally connected to the other side bar 120 by a pivot bolt 122 passing therethrough. The side bars 118 and 120 are preferably of T-shaped cross-section (Figures 3 and 5) and have vertical outer flanges 124 and 126 respectively, and central horizontal webs 128 and 130 respectively. The webs 128 and 130 are provided with longitudinally spaced holes 132 and 134 respectively adapted to receive ball-headed pins 136 and 138 likewise passing through the opposite ends of a spreader bar 140. The spreader bar 140 (Figure 3) is of I-beam construction with its opposite ends slotted out as at 142 and 144 to receive the webs 128 and 130 respectively and their pins 136 and 138. The pins 136 and 138 are quickly removable, so that the opposite ends of the spreader bar 140 may be secured by them in any pair of the holes 132 and 134 respectively so as to spread the side bars 118 and 120 further apart or closer together in order to vary the angle between them and consequently the separation of their rearward ends 146 and 148 respectively.

Mounted on and secured to the rearward ends 146 and 148 of the side bars 118 and 120 are C-shaped bumper engaging members or buffers 150 and 152 respectively these being provided with arcuate bumper-contacting pads 154 of rubber or the like on their inner sides. Extending downward from the lower end of each of the bumper-engaging members 150 and 152 are chain guides 156 (Figures 4 and 6). The webs 128 and 130 near the forward ends 146 and 148 of the side bars 118 and 120 are provided with chain slots 158 having narrow forward extensions 160 of single-link width as compared with the widths of the main portions 162 thereof. This construction enables the tie chain 108 to be temporarily anchored in the single link extension 160 of the slot 158, or to be freely slidable through the wide portion 162 thereof, as desired or as determined by the circumstances (Figures 4 and 5 as contrasted with Figures 1 and 2).

In the operation of the invention, let it be assumed that an automobile 14 has been disabled on the road R and is to be towed by the towing vehicle or wrecking truck 34 to a garage equipped with the tow bar device 10. Having arrived at the scene of the accident or breakdown of the automobile 14, the operator backs the towing vehicle 34 into close proximity to the rear bumper 12 or front bumper 13 of the automobile 14. Let it be assumed that the latter is to be towed rear end foremost, using the rear bumper 12. To adjust the bumper engaging members 150 and 152 to the proper height of the bumper 12, before connecting the tie chains 108 to the rear axle housing 22 the operator slides one of the links of each tie chain 108 into the forward extension 160 of the slot 158 (Figures 4 and 5), the single-link width of which prevents the chain 108 from slipping upward or downward. The operator then manipulates the crank 70 to raise or lower the boom 48 and the tie chains 108 attached thereto so as to raise or lower the rear ends 146 and 148 of the side bars 118 and 120, pivoting the tow bar device 10 around the coupling 144, until the bumper-engaging members 150 and 152 are at the proper heights for engaging the bumper 12.

The operator then adjusts the angle between the side bars 118 and 120 by shifting the pins 136 and 138 to the appropriate pair of holes 132 and 134, necessary to cause the spreader bar 140 to achieve the correct spacing of the bumper-engaging members 150 and 152 and at the same time to avoid the bumper guards 16. While Figures 1 and 2 show the bumper-engaging members 150 and 152 in contact with the bumper 12 inside the bumper guards 16, it will be understood that they may be positioned outside the latter where the bumper guards 16 are closer together.

The operator now backs the towing vehicle 34 the remaining distance necessary to bring at least one of the bumper-engaging members 150 and 152 into engagement with the bumper 12, whereupon he passes each of the chains 108 between the chain guides 156 and loops the chain 108 around the axle housing 22, securing it in position by the chain hook 110 (Figure 1). It is not necessary at this time that both of the bumper-engaging members 150 and 152 be exactly in contact with the bumper 12, as the device 10 is automatically adjusted during hoisting to a condition where both bumper-engaging members 150 and 152 are properly in such contact.

To hoist the rearward end of the automobile 14, the operator now manipulates the crank 78 to rotate the windlass or winding drum 80, causing the cable 82 to raise the running block 98 and the two tie chains 108 connected to its hook 104. As hoisting occurs, the chains 108 are pulled out of the single-link width slot extensions 160 into the main slot portions 162, through which they can freely move. The consequent raising of the block 98 causes the chains 108 around the axle housing 22 to pull the bumper-engaging members 150 and 152 and their pads 154 firmly into engagement with the bumper 12 as the rear wheels 26 of the automobile 14 are hoisted off thhe ground. The operator continutes to rotate the winding drum 80 until the rearward end of the automobile 14 is raised to the desired height for towing, whereupon he locks the winding drum 80 by its pawl and ratchet or other locking means in the usual way. The load imposed by the automobile 14 upon the towing vehicle 34 is now distributed partly between the axle housings 22 and the automobile bumper 12, instead of imposed wholly upon the bumper 12, as in the case of prior tow bars attached exclusively to the bumper.

With the automobile 14 thus hoisted in the manner shown in Figure 7, the operator then performs the towing operation, with the automobile front wheels 30 in contact with the road R. Although the drawings show the automobile 14 being towed rear end foremost, it is self-evident that it may alternatively be towed with the forward end foremost. In the latter instance, the outer ends of the tie chains 108 are looped around the front wheel suspensions and secured in the same manner as shown in Figure 1, and the front end is hoisted so that the bumper contacting members 150 and 152 come into engagement with the front bumper 13 rather than the rear bumper 12. The procedure, however, is similar to that already described and hence requires no additional description.

What I claim is:

1. A tow bar device for a wrecking truck equipped with a hoist adapted to be connected to a towing chain attachable to an under part of a bumper-equipped automobile to be towed, said device comprising a tow bar structure having a connector disposed near its forward end adapted to be attached to the wrecking truck, a chain engaging portion disposed near the rearward end of said tow bar structure adapted to receive and fulcrum said chain in its hoisted and towing position, and a bumper-engaging structure secured to the rearward portion of said tow bar structure and configured to fit said bumper, said tow bar structure including a plurality of elongated members connected to one another near their forward ends and diverging therefrom toward their rearward ends, one of said members also having a plurality of laterally-spaced chain guides on the under side thereof disposed near the rearward end of said tow bar structure.

2. A tow bar device for a wrecking truck equipped with a hoist adapted to be connected to a towing chain attachable to an under part of a bumper equipped automobile to be towed, said device comprising a tow bar structure having a connector disposed near its forward end adapted to be attached to the wrecking truck, a chain engaging portion disposed near the rearward end of said tow bar structure adapted to receive and fulcrum said chain in its hoisted and towing position, and a bumper-engaging structure secured to the rearward portion of said tow bar structure and configured to fit said bumper, said tow bar structure including a plurality of elongated members connected to one another near their forward ends and diverging therefrom toward their rearward ends, said bumper-engaging structure including an approximately C-shaped bumper-engaging buffer secured to each of said rearward ends.

3. A tow bar device for a wrecking truck equipped with a hoist adapted to be connected to a towing chain attachable to an under part of a bumper-equipped automobile to be towed, said device comprising a tow bar structure having a connector disposed near its forward end and adapted to be attached to the wrecking truck, a chain engaging portion disposed near the rearward end of said tow bar structure adapted to receive and fulcrum said chain in its hoisted and towing position, and a bumper-engaging structure secured to the rearward portion of said tow bar structure and configured to fit said bumper, said tow bar structure including a plurality of elongated members connected to one another near their forward ends and diverging therefrom toward their rearward ends, each of said elongated members having said chain-engaging portion, said chain-engaging portion including a slot of single-chain-link width adapted to receive and releasably lock a selected link of said chain between the adjacent links thereof.

4. A tow bar device for a wrecking truck equipped with a hoist adapted to be connected to a towing chain attachable to an under part of a bumper-equipped automobile to be towed, said device comprising a tow bar structure having a connector disposed near its forward end adapted to be attached to the wrecking truck, a chain engaging portion disposed near the rearward end of said tow bar structure adapted to receive and fulcrum said chain in its hoisted and towing position, and a bumper-engaging structure secured to the rearward portion of said tow bar structure and configured to fit said bumper, said tow bar structure including a plurality of elongated members connected to one another near their forward ends and diverging therefrom toward their rearward ends, each of said elongated members having said chain-engaging portion, said chain-engaging portion including an aperture of full-chain-link width adapted to loosely and slidably receive said chain.

5. A tow bar device for a wrecking truck equipped with a hoist adapted to be connected to a towing chain attachable to an under part of a bumper-equipped automobile to be towed, said device comprising a tow bar structure having a connector disposed near its forward end adapted to be attached to the wrecking truck, a chain engaging portion disposed near the rearward end of said tow bar structure adapted to receive and fulcrum said chain in its hoisted and towing position, and a bumper-engaging structure secured to the rearward portion of said tow bar structure and configured to fit said bumper, said tow bar structure including a plurality of elongated members connected to one another near their forward ends and diverging therefrom toward their rearward ends, each of said elongated members having said chain-engaging portion, said chain-engaging portion including an aperture of full-chain-link width adapted to loosely and slidably receive said chain, said chain-engaging portion also including a slot of single-chain-link width adapted to receive and releasably lock a selected link of said chain between the adjacent links thereof.

References Cited in the file of this patent
UNITED STATES PATENTS

| | | |
|---|---|---|
| 1,794,148 | Collins | Feb. 24, 1931 |
| 2,045,793 | Pearson et al. | June 30, 1936 |
| 2,512,635 | Flowers | June 27, 1950 |
| 2,553,229 | Barhorst | May 15, 1951 |
| 2,555,663 | Schouboe | June 5, 1951 |
| 2,570,482 | Pruitt | Oct. 9, 1951 |
| 2,661,106 | Morgan | Dec. 1, 1953 |
| 2,668,064 | Bolling | Feb. 2, 1954 |
| 2,700,481 | Donatelli | Jan. 25, 1955 |
| 2,712,877 | Wiley | July 12, 1955 |